United States Patent [19]

Smith

[11] 4,356,961
[45] Nov. 2, 1982

[54] DUAL DEADBAND CONTROL SYSTEM

[75] Inventor: Gary A. Smith, Plymouth, Minn.

[73] Assignee: Honeywell, Inc., Minneapolis, Minn.

[21] Appl. No.: 274,938

[22] Filed: Jun. 18, 1981

[51] Int. Cl.$^3$ .............................. F25B 7/00; H02J 1/00
[52] U.S. Cl. ...................................... 236/1 EA; 62/175; 307/39
[58] Field of Search ............ 236/1 EA, 1 EB; 165/26; 62/175, 228 C; 307/41, 39

[56] References Cited

U.S. PATENT DOCUMENTS 3,623,545 11/1971 Pinckaers.
3,887,000 6/1975 Pinckaers.
4,072,866 2/1978 Kabat .................................... 307/41
4,152,902 5/1979 Lush ................................. 236/1 EA

OTHER PUBLICATIONS

U.S. Application Ser. No. 202,985, filed Nov. 3, 1980 in the name of Ronald Benton et al., entitled, Microprocessor Discharge Temperature Air Controller for Multi-Stage Heating and/or Cooling Apparatus and Outdoor Air Usage Controller.

*Primary Examiner*—William E. Wayner
*Attorney, Agent, or Firm*—Charles J. Ungemach

[57] ABSTRACT

A temperature control system utilizing a plurality of heating or cooling devices to maintain the temperature at a desired level, minimizing rapid multi-stage cycling by using dual deadband zones.

21 Claims, 8 Drawing Figures

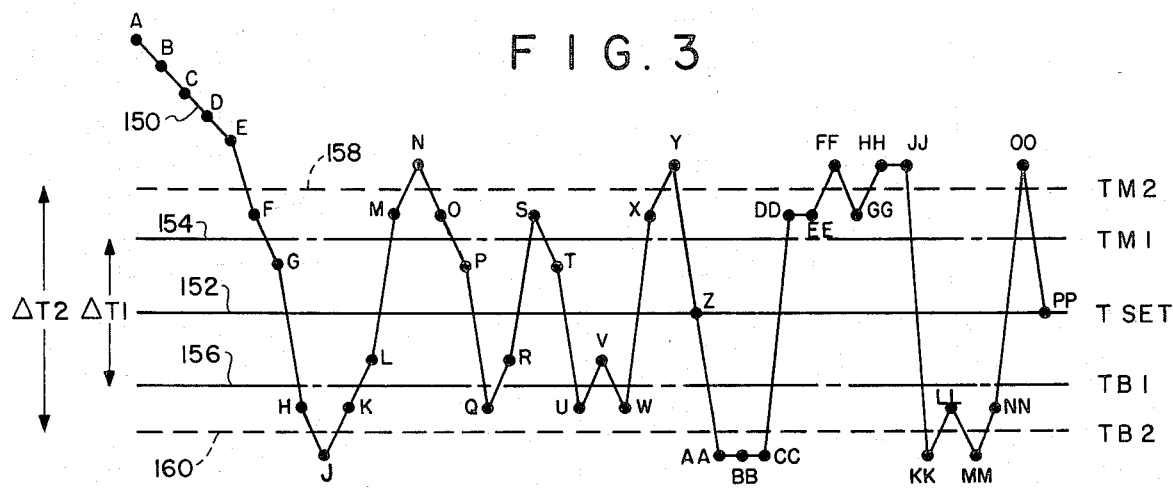
FIG. 3
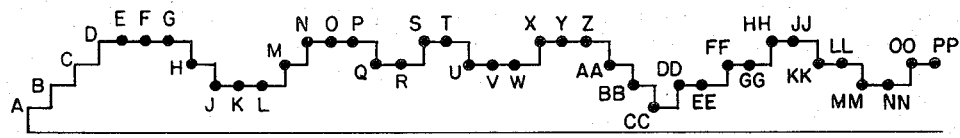
FIG. 5
FIG. 4
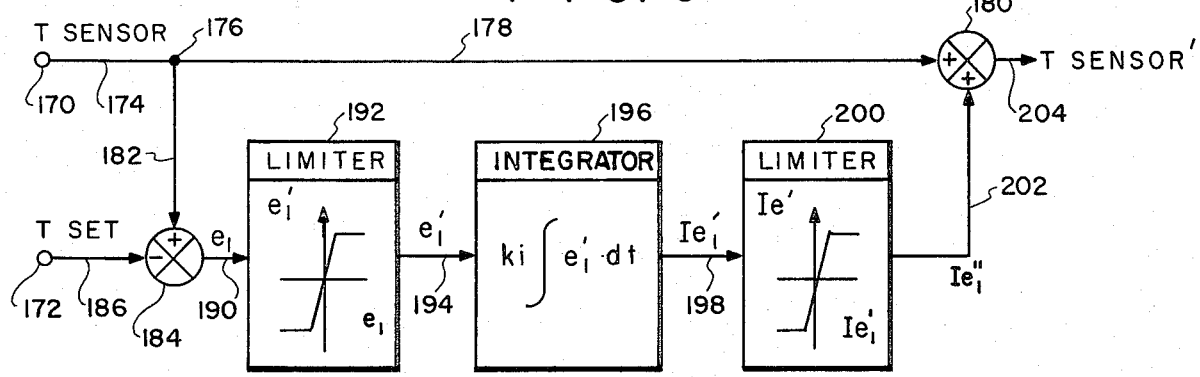
FIG. 6

DUAL DEADBAND CONTROL SYSTEM

BACKGROUND OF THE INVENTION

Temperature control systems which utilize a plurality of heating or cooling devices to maintain the temperature at some location proximate a predetermined desired temperature or setpoint are broadly old in the art. A copending application of Ronald Benton et al, Ser. No. 202,985 filed Nov. 3, 1980 describes such a system. In the prior art systems, it is normal to have a number of stages of heating and cooling each of which is turned "on" and "off" at predetermined temperature variations from the setpoint. For example, in a chiller system, a first stage of cooling would be turned "on" when the temperature varied from the setpoint by a first amount with a second chiller being turned "on" when the temperature reached a second value with respect to the setpoint, the third being turned "on" as the temperature increased to a certain point even further away from the setpoint and so on through the number of stages that were provided. Likewise, when the temperature began to decline, the last stage would be turned "off" at a first temperature from the setpoint and successive stages in each being turned "off" at different temperatures until the proper temperature was again reached. One difficulty with such a system occurs when there are rather rapid changes in the load causing rapid temperature variations. When this occurs, the various stages must turn "on" and "off" in rather rapid succession resulting in multistage cycling that is undesirable and possibly damaging to the compressors.

SUMMARY OF THE INVENTION

The present invention overcomes the rapid multistage cycling problem while still providing accurate temperature control and assuring that minimum "on" and "off" equipment operation timing requirements are met. This is accomplished using a dual deadband in which two temperature dead zones are used to define limits for control action. The first deadband is used to control the "on" and "off" states of which ever one of the multiple heating or cooling devices is presently cycling while leaving the others either "on" or "off". If the temperature were to increase or decrease beyond the limits of the first dead zone and cross into the second deadband range, then a different compressor or heater would be turned "on" or "off" to become the cycling stage and it, thereafter, would be controlled again by the first deadband. More specifically, assuming a chiller application, a setpoint of a certain temperature would be commanded into the system and a first deadband defined as, for example, three degrees on either side of the setpoint and a second deadband commanded into the system at, for example, five degrees on either side of the setpoint. Then, if the temperature were within the first deadband and the first and second stages of a four-stage system were on, the third stage would be considered the cycling stage. If the temperature increased more than three degrees beyond the setpoint, then the third stage would go on to bring the temperature back down towards the setpoint and if the temperature decreased beyond three degrees below the setpoint, then the third stage would be switched "off". On the other hand, if after switching the third stage "on" the temperature continued to rise to where it became five degrees beyond the setpoint, then the fourth stage of chilling would be activated and it would then thereafter become the cycling stage. If the temperature were then to fall more than three degrees below the setpoint, the fourth stage would be turned "off". Thereafter, if the temperature fell to more than five degrees below the setpoint, the third stage would be turned "off" and would thereafter become the cycling stage. The present invention also includes means for setting minimum "on" and "off" times for each of the stages of the system and provides for determination of the rate of change of temperature so that if the temperature were falling at a fast enough rate even though it were presently above the first deadband, an additional stage of chilling would not be introduced.

BRIEF DESCRIPTION OF THE DRAWINGS

FIG. 3 is a chart showing exemplary temperature variations and the deadbands used in the system;

FIG. 4 is a chart showing the set point and deadbands of the control systems of the prior art;

FIG. 5 shows the "on" and "off" stages of the chillers of the present invention;

FIG. 6 shows a circuit for converting the actual temperatures sensed to a temperature used by the system.

DETAILED DESCRIPTION OF THE PREFERRED EMBODIMENT

While the present invention is useful in various kinds of condition control systems, it is most particularly useful in temperature control systems. For purposes of explanation, the system will be described in terms of a chiller or air conditioning system but it should be realized that the principles involved may equally be applied to heating control systems as well as other condition control systems such as humidity.

Figure 1:
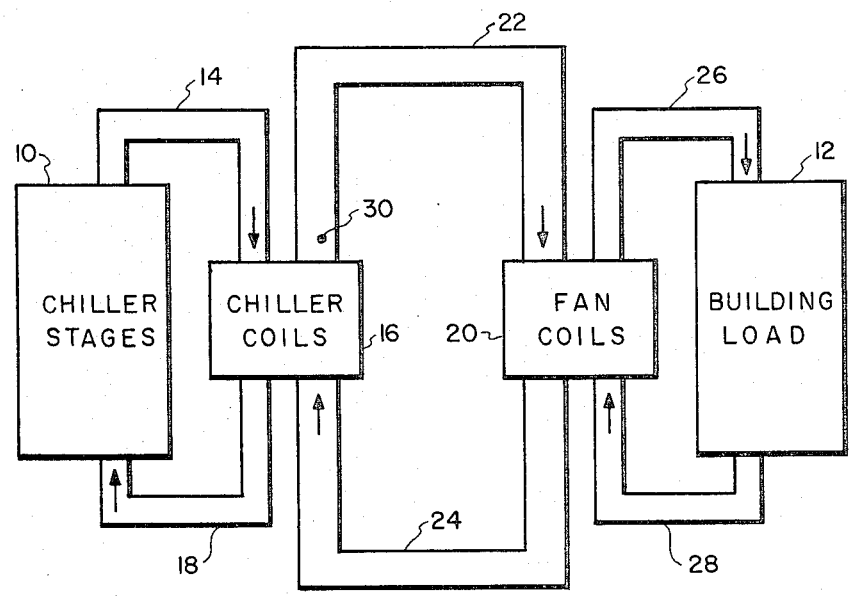
FIG. 1 is a generalized block diagram of a chiller system.

Referring now to FIG. 1, a refrigeration system is shown in block diagram form and includes a block identified by reference numeral 10 that houses the various chiller stages or air conditioning compressors used to cool the building load 12. Any number of air conditioning units may be included within the block 10 but for simplicity, the present invention will be described in terms of four refrigeration units or stages. The chiller stages operate to cool a refrigerant passing therethrough and transfer the refrigerant by means of a conduit 14 to the chiller coils shown in block 16. After passing the coils, the fluid is returned to the chiller stages block 10 by a conduit 18. The chiller coils operate to cool a fluid such as water passing therethrough and being transferred to a fan coils box 20 by means of a conduit 22. After passing through the fan coils coils, the water is returned to the chiller coils via conduit 24. The fan coils box operates to transfer the cooling to a second fluid passage therethrough which is transferred to the building load 12 via a conduit 26 and thereafter is returned to the fan coils box via conduit 28. It should be understood that the fluid used may be air, brine or other fluids and combinations thereof.

The fluid in conduit 24 enters the chiller coil box 16 at a first temperature, $T_0$, and leaves the chiller 16 via conduit 22 at a second temperature, $T_1$, which is lower than $T_0$. The chilled fluid in conduit 22 enters the fan coils box 20 at a first temperature, $T_2$, and leaves the fan coils box 20 at a second temperature, $T_3$, higher than $T_2$. In order to maintain temperature control, a temperature sensor 30 is shown placed in the fluid leaving the chiller coil box 16 and it is this temperature, T, which will be used to describe the operation of the system of the present invention. It should be understood, however, that the temperature sensor may be placed substantially anywhere in the system in order to maintain the temperature and the placing of the temperature sensor in the fluid leaving the chiller coil box 16 is only by way of example.

Figure 2:
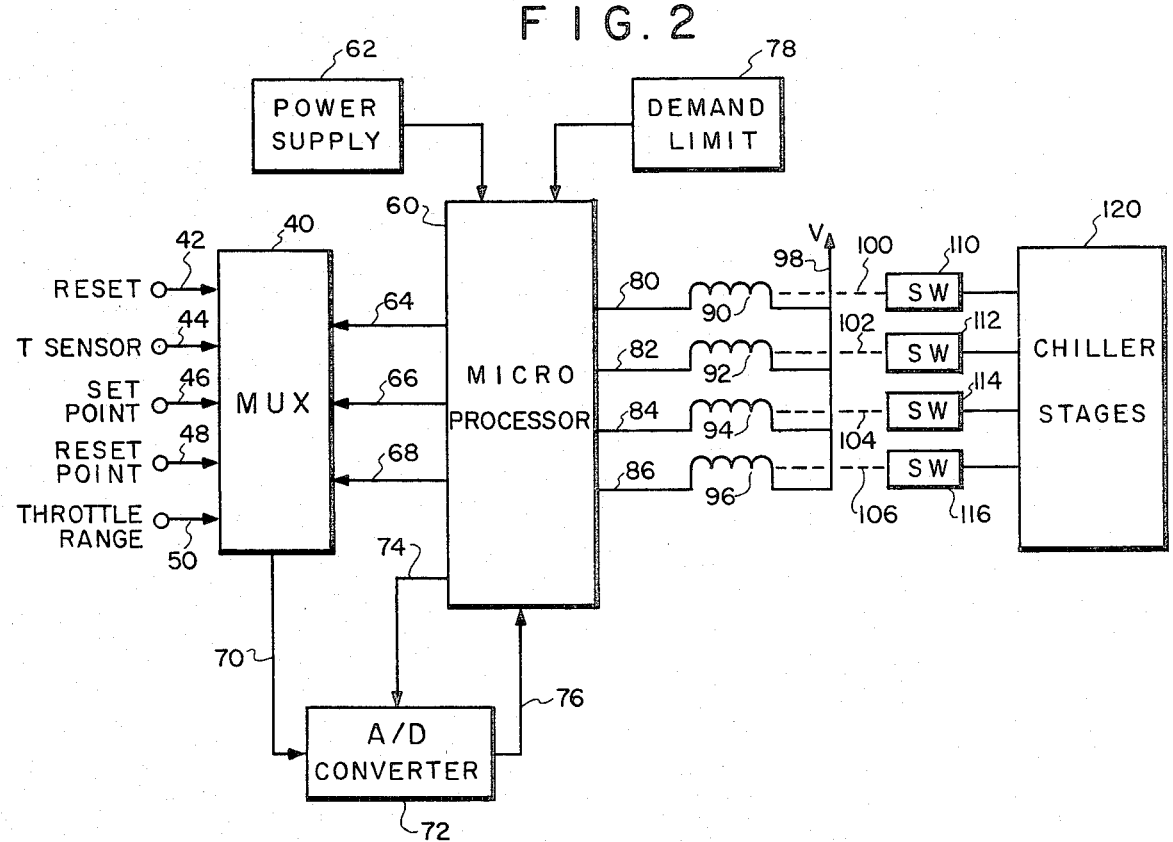
FIG. 2 is a block diagram of the control system for the chiller system.

FIG. 2 shows a block diagram of the present system which is like the above-referred to Benton et al copending application except that the detailed circuitry and any unnecessary components have been omitted. In FIG. 2, a multiplexer 40 is shown receiving five inputs identified as the reset input 42, the T sensor input 44, the setpoint input 46, the reset point input 48 and the throttle range input 50. The reset input 42 is used in the event that it is desired to change the setpoint temperature upon the occurrence of a condition such as change of outside temperature as is well known. The T sensor input is the input from the temperature sensor 30 of FIG. 1 and represents the temperature to be controlled. The setpoint input is an input that establishes the desired temperature which the system is supposed to maintain. The reset point input is the input which establishes what the reset value will be upon the occurrence of a reset input at 42. The throttle range input establishes the limits above and below the setpoint in which no control action will occur but beyond which the cycling stage of cooling or heating is turned "on" or "off".

The inputs to the multiplexer 40 are in analog form and it is desired to convert these to digital form for use by a microprocessor 60. To this end, microprocessor 60 is connected to a power supply 62 and operates by means of lines 64, 66 and 68 to command the multiplexer 40 to read the inputs it is receiving at inputs 42-50 serially and present them on an output 70 to an A-to-D converter 72. The microprocessor 60 commands an A-to-D conversion routine by a signal on conductor 74 and the A-to-D converter then presents the values of the various inputs to microprocessor 60 in digital form by means of a conductor 76. The microprocessor also has an input from a demand limit box 78 which informs the microprocessor as to the number of heating or cooling units available for use. In the present example, a digital signal from the demand limit box 78 would be presented to microprocessor 60 indicating that four chiller stages were available. The microprocessor 60 is a conventional device and may be of the type used in the above-referred to copending Benton et al application; i.e., type number ID8048 manufactured by Intel Corp., Santa Clara, Calif. The microprocessor will have the internal capability of performing many functions used in the present invention. For example, whereas the throttle range appearing as input 50 to the multiplexer 40 initially sets up the amount of variation which is allowed around the setpoint, the present invention uses a second deadband which is larger than the deadband established by the throttle range. The second throttle range, which may be for example two degrees greater than the throttle range at input 50, may be built into microprocessor 60 so that no matter what throttle range is set in by input 50, the microprocessor will establish a second throttle range two degrees larger. Likewise, the microprocessor can determine the rate of change of T sensor temperature and can compute time periods so that the amount of "on" and "off" time of various stages of chiller operation may be established. The microprocessor can also convert the T sensor temperature to a T sensor' temperature used by the system all of which will be described hereinafter.

The outputs of microprocessor 60 are shown on lines 80, 82, 84 and 86 leading to solenoid windings 90, 92, 94 and 96 the other side of which are connected to a source of voltage V by a conductor 98. The solenoids operate through mechanical connections 100, 102, 104 and 106 respectively to turn "on" and "off" switches 110, 112, 114 and 116 respectively. The operation of switches 110-116 operate to turn "on" and "off" the various stages of cooling in the chiller stages box 120 which may be the same as the chiller stages box 10 of FIG. 1. In other words, a signal on conductor 80 from microprocessor 60 will operate through solenoid winding 90 to turn "on" switch 110 and thereby cause the first stage of chiller operation to be "on". A signal on line 82 will operate through solenoid winding 92 to activate switch 112 and cause the second stage of chiller operation to be "on". Likewise, signals on conductors 84 and 86 will operate through solenoid windings 94 and 96 to activate switches 114 and 116 and turn "on" the third and fourth stages of chiller operation respectively.

Referring now to FIGS. 3, 4 and 5, the theory of operation of the present invention and a comparison between the present invention and the prior art will be undertaken.

In FIG. 3, a presumed temperature curve 150 is shown which may be the output of the temperature sensor 30 of FIG. 1 or a modified value T sensor' which will be described. Curve 150 varies from a point A in the upper left-hand portion of FIG. 3 through a number of various points to a final point PP at the far right-hand portion of FIG. 3. This temperature variation occurs over a period of time. The time between points A and B and C, etc. will be presumed large enough to avoid the operation of the minimum "on" and "off" time functions for the chiller stages as will be explained and it will be assumed that the slope of the temperature curve throughout is such as will not operate the rate function of the system also as will be explained.

In FIG. 3, a solid line 152 is shown representing the T set or desired temperature about which the sensed temperature should be maintained. A first throttling range or deadband $\Delta T1$ is shown extending from a dash-dot line 154 to dash-dot line 156 on both sides of the T setpoint. Dash-dot line 154 is the line above which an additional cooling stage should be commanded and is identified as TM1 or the first make point. Dash-dot line 156 is the line below which the cycling stage should be cutoff and is identified by TB1 or the first breakpoint. A second deadband or throttle range $\Delta T2$ is shown extending from a dashed line 158 to a dashed line 160 on either side of the T setpoint a predetermined amount greater than $\Delta T1$. Dashed line 158 is the point above additional stages of cooling should be added and is identified as TM2 or the second make point and dashed line 160 is the temperature below which additional "on" stages of cooling should be turned "off" and is identified as TB2 or the second breakpoint. It should be understood that in normal operation, there may be, for example, two stages which are in the "on" condition and a third or cycling stage which is "off" so long as the temperature is below TM1. Should the temperature rise above TM1, then the cycling stage would be turned to an "on" condition to provide additional cooling. If the temperature should drop below the TB1 point, the cycling stage would be turned "off". If after the temperature has risen above TM1 and third stage has been turned "on" the temperature continues to rise past the TM2 point, then the fourth cooling stage would be turned "on" and it would then become the cycling stage. Thereafter should the temperature fall below the TB1 level, the new fourth stage, which is cycling, would be turned "off" and would not go "on" again unless the temperature again rose above the TM1 level. On the other hand, if after the fourth stage has been actuated the temperature falls first below TB1 turning the fourth stage "off" and then below TB2, then the third stage would be turned "off" and would again become the cycling stage. Should the temperature be below the TB2 level, again before the third stage has been turned "on", then the second stage would be turned "off" and would become the cycling stage. In the prior art systems, each stage of mechanical cooling would be controlled by individual make and break temperature levels. For each increasing stage of cooling, the temperature level for the break "off" command would be higher than the break level of the previous stage. Likewise, the make "on" temperature levels would be increasingly higher for each higher cooling stage. Make and break temperature levels can overlap or be entirely separate depending on the application. For a discharge water temperature control, prior art make and break levels would typically be arranged as shown in FIG. 4. The first stage make and break levels are TM1 and TB1, respectively. Similarly, TM2 and TB2 determine the on and off commands for the second stage, TM3 and TB3 are for the third stage and TM4 and TB4 for the fourth stage. Therefore, the first stage would be turned "on" when the temperature reaches temperature TM1, stage 2 would be turned "on" when the temperature reaches TM2, etc. The stages would turn off as the temperature falls below the break levels, with all stages off when the temperature is below TB1.

Several features of the prior art can lead to unstable or unsatisfactory system performance. First, note that the prior art will control temperature within limits TB1 and TM1 when the first stage only is cycling. When a second stage is required, the temperature cycles between TB2 and TM2 and so on until all stages are on and the final stage cycles between TB4 and TM4. Thus, the temperature control range changes as the number of stages changes. FIG. 5 shows the variations of the various stages as they would go "on" and "off" with the variations of temperature in FIG. 3 under the present invention.

At the beginning of operation, it is assumed that the temperature being sensed is well above the TM2 level at point A. Thus, in the present invention in FIG. 5, the first stage would go "on" but, due to the minimum amount of time "on" requirement of the present invention, additional stages would not go "on" in the present invention until the minimum time had elapsed. At point B, after the minimum time, the temperature is still above the TM2 level and accordingly, in the present invention, the second stage of cooling would go "on". Again, point C is well above the TM2 level and accordingly, the present invention would turn the third stage of cooling "on" and at point D, still above the TM2 level, the present invention would turn "on" the fourth stage of cooling. At point E, the present invention would operate to leave all four stages "on" since there is no fifth stage that can be turned "on". At point F, the temperature is dropped below the TM2 level but is above the TM1 level so no stage will go "off" since the temperature has not fallen below the TB1 level. Accordingly in FIG. 5, all four stages remain "on". Again at point G, the temperature has fallen below the TM1 level but in the present invention, since the temperature has not reached the TB1 level, all four stages would remain "on". At point H, the temperature has fallen below the TB1 level and accordingly, since the temperature is now below the TB1 level, the fourth stage of cooling would be turned "off". At point J, the temperature has fallen below the TB2 level and accordingly the third stage would be turned "off" and become the cycling stage. At point K, the temperature has again risen above the TB2 level but in the present invention, the temperature must rise above the TM1 level before the cycling stage is turned "on" and accordingly, two stages remain "on" in FIG. 5. At point L, the temperature has risen above the TB1 level but again, since the temperature has not reached the TM1 level, two stages remain "on". At point M, the temperature has risen above the TM1 level and the third stage is now turned "on". At point N, the temperature is again above the TM2 level and the fourth stage is turned "on". In the present invention, the fourth stage is now the cycling stage and accordingly, it will not be turned "off" until the temperature has fallen below the TB1 level. At point O, the temperature has fallen below the TM2 level but all four stages remain "on" in FIG. 5. At point P, the temperature has fallen below the TM1 level but, again, all four stages remain "on" as seen in FIG. 5. At point Q, the temperature has fallen below the TB1 level and accordingly, the fourth stage is turned "off" in FIG. 5. The fourth stage is still the cycling stage in FIG. 5 and will not be turned "on" again until the temperature rises above the TM1 level. At point R, the temperature has risen above the TB1 level and the three stages presently "on" in FIG. 5 remain "on". At point S, the temperature has again risen above the TM1 level and the fourth stage is again turned "on". At point T, the temperature has again fallen below the TM1 level but all four stages remain "on" in FIG. 5. At point U, the temperature has fallen below TB1 and accordingly the fourth stage is turned "off" as seen in FIG. 5. At point V, the temperature again rises above the TB1 level but since the temperature must rise above the TM1 level before the cycling stage (the fourth stage) is turned "on" in the present invention, all three stages remain "on" in FIG. 5. At point W, the temperature again goes down below TB1 and again the three stages of the present invention remain "on". At point X, the temperature has risen rapidly beyond the TB1 and TM1 levels and the fourth stage is turned back "on" since it is still the cycling stage. At point Y, the temperature has risen above the TM2 level and since there are only four stages all of which were previously "on", nothing further occurs. At point Z, the temperature has fallen below the TM2 level and the TM1 level and since the cycling stage is still the fourth stage, nothing further happens. At point AA, the temperature has fallen below both TB1 and TB2 and the fourth stage is turned "off" due to the fact that the temperature has fallen below TB1. At point BB, the temperature remains below TB2 and the third stage, which was previously "on", is now turned "off" and becomes the cycling stage. At point CC, the temperature is still below TB2 and the second stage is turned "off" and now becomes the cycling stage. At point DD, the temperature has rapidly risen to above TM1 and the second stage is turned back "on" and remains the cycling stage. At point EE, the temperature remains above TM1 so no further action occurs in FIG. 5. At point FF, the temperature rises above TM2 and in FIG. 5, the third stage of cooling goes "on" and becomes the cycling stage. At point GG, the temperature has fallen below TM2 but since the cycling stage will not turn "off" until the temperature has fallen below TB1 in the present invention, nothing further happens. At point HH, the temperature has risen above TM2 and accordingly the fourth stage is turned "on" in FIG. 5 to become the cycling stage. At point JJ, the temperature remains above the TM2 level, but since there are no further stages to turn "on", nothing further happens. At point KK, the temperature has fallen all the way to below TB2 which causes only the fourth stage to be turned "off". At point LL, the temperature has risen above the TB2 level but since the temperature must rise above TM1 before additional cooling is turned "on", the third remains "on". At point MM, the temperature falls below TB2 again and the third stage is turned "off" since the temperature is again below TB1. At point NN, the temperature rises again above TB2 but nothing further happens since the temperature must rise above TM1 before additional stages of cooling can occur. At point OO, the temperature has risen above TM2 and, since the temperature has risen above TM1, the third stage is turned "on". At point PP, the temperature has dropped below both TM2 and TM1 but nothing further happens in FIG. 5 since the temperature has to fall below TB1 before the cycling will again be turned "off".

It is seen from FIGS. 3, 4 and 5 that the temperature control in accordance with the present invention involves much less turning "on" and "off" of the various stages of cooling than does in the prior art. In addition, closer temperature control is possible.

In the above-described operation, it has been assumed that the temperature curve 150 of FIG. 3 was the temperature sensed by the thermostat 30 of FIG. 1. In actual practice, difficulties may arise if the sensor temperature is used as the controlling temperature. For example, if the temperature from the sensor were to remain at a fixed value for a long period of time, say just below the TM1 level, in the present invention no further stages of cooling would be turned "on" during the entire time. For some applications, however, it may be desirable to turn "on" a stage of cooling to bring the temperature back down to the T set level even though it remains within the first deadband $\Delta T1$. To overcome this problem, the circuit of FIG. 6 may be utilized wherein the T sensor temperature appearing at point 170 is compared with the T set temperature appearing at point 172 and the difference integrated over a period of time so as to create a new temperature signal T sensor' which is the sum of the T sensor temperature and the integrated difference between T sensor temperature and T set over a period of time. More particularly, the T sensor temperature is presented by means of a conductor 174 to a junction point 176 and from junction point 176 on a conductor 178 to a sum circuit 180. The T sensor value at junction point 176 is also conducted by a conductor 182 to a difference circuit 184 which has as its other input, the T set temperature presented on conductor 186. The difference between the T sensor value and the T set value is a value $e_1$ appearing on conductor 190 which is presented through a limiter 192 where it becomes $e'_1$ on a conductor 194 presented to an integrator 196. The output of integrator 196 is an integrated value $Ie'_1$ appearing on conductor 198 and presented to a second limiter 200 whose output appears on a conductor 202 and presented to the other input of the sum circuit 180. The purpose of limiter 192 is to limit the magnitude of the signal difference between T sensor and T set so as not to integrate very large difference signals as might occur during a start up procedure where the temperature being sensed was quite large with respect to T set. Accordingly, limiter 192 will limit the value of $e_1$ to a more useable magnitude as, for example, the difference between TM2 and T set. Thus, if the temperature is very large at the beginning of a cycle, although $e_1$ might be large, $e'_1$ will be limited to a smaller value, this value is then integrated by the integrator 196 to produce an ever increasing signal with time $Ie'_1$. The purpose of limiter 200 is to prevent $Ie'_1$ from becoming too large as might occur, for example, if the temperature from T sensor were to remain just below the TM2 level for a fairly long period of time in which case the value of $Ie'_1$ might increase above that of the TM2 level and thereafter if the temperature were to drop down to T set or below, the output from the integrator would be sufficiently large as to call for additional cycles of cooling when none were needed. Limiter 200 holds the value that the $Ie'_1$ can attain to some reasonable amount less than the TM2 value so that should the temperature then thereafter fall down to or below the T set value, the cycling stage would remain "on" as is desired. The integrated and limited output appearing on conductor 202 is added to the T sensor value on conductor 178 by the sum circuit 180 and the result is a T sensor' signal appearing on conductor 204 which is used by the system to control the "on" and "off" cycles of the various stages. Accordingly, in FIG. 3, the temperature of the curve 150 is actually the T sensor' signal in the present invention.

Figure 7A:
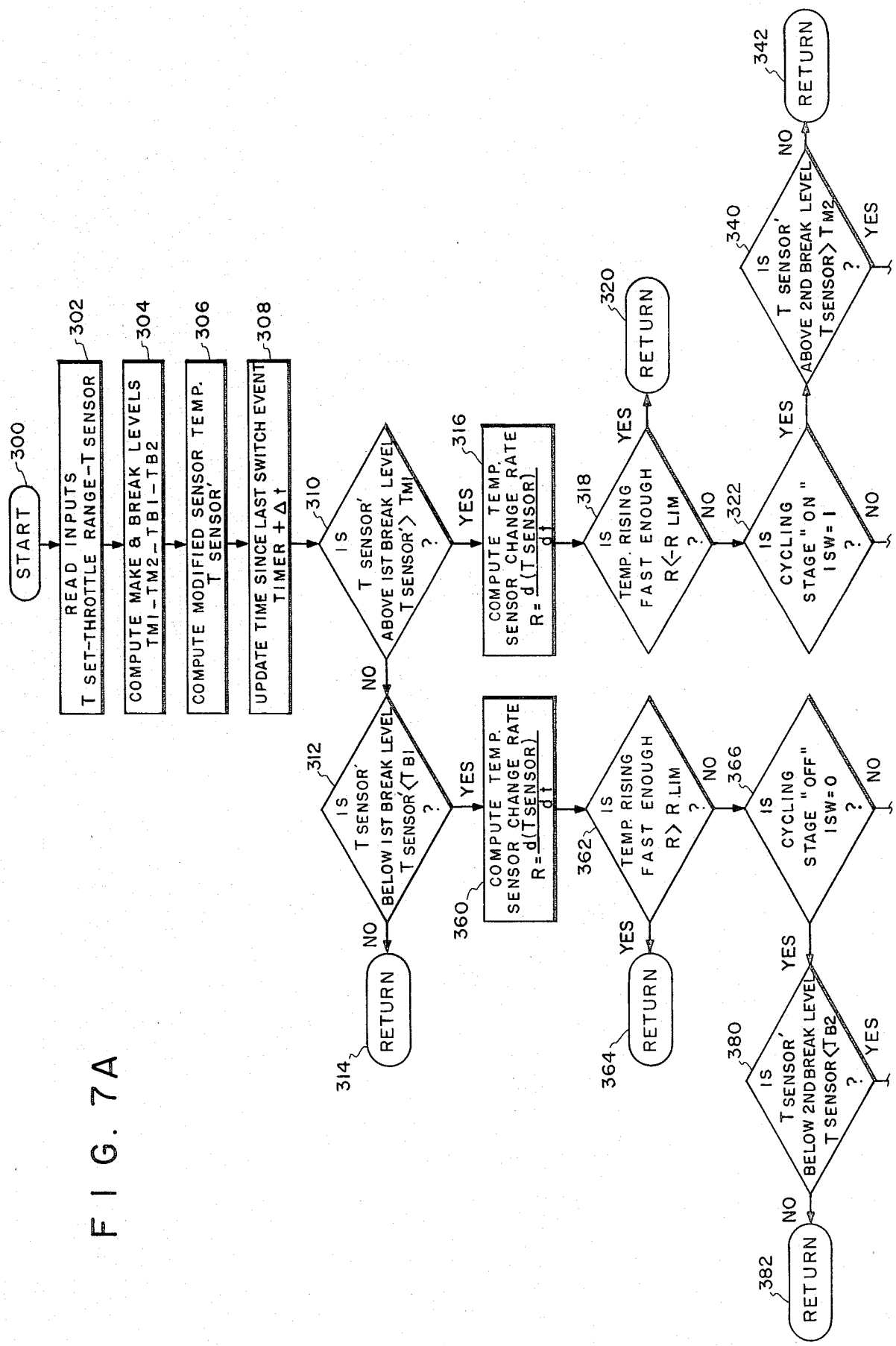
FIGS. 7A & 7B show a flowchart for use in the present invention.
Figure 7B:
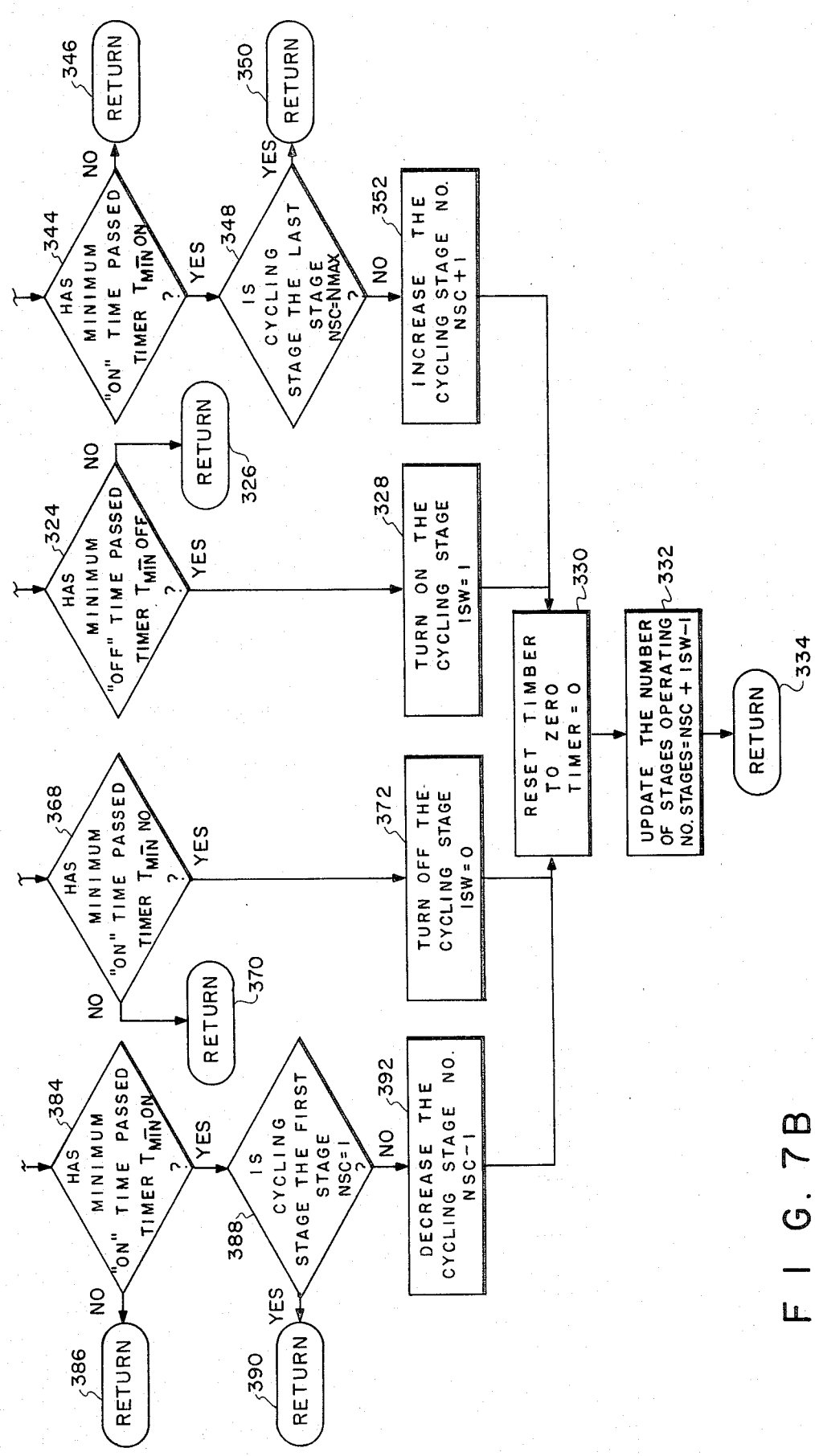

Turning now to FIG. 7, a flowchart is shown which is used to program the microprocessor 60 of FIG. 2 in order to perform the "on" and "off" functions for the various stages as is described in connection with FIGS. 3, 4 and 5. In FIG. 7, the flowchart starts with a command box 300 labelled START. Upon receiving a start signal from command box 300, the system will read the various inputs presented to it as is shown by procedure box 302. The inputs will be the T set temperature, the throttling range and the T sensor temperature; i.e., the temperature sensed by the thermostat. After reading the inputs, the system will compute the make and break levels as is shown in procedure box 304 so as to establish the TM1, TM2, TB1 and TB2 levels shown in FIG. 3. The microprocessor will then compute the modified sensor temperature as is shown by procedure box 306 and will determine from the T sensor temperature the T sensor' value as explained in connection with FIG. 6. The microprocessor will then update the time since the last switch event as is shown in procedure box 308 or, in other words, will determine the amount of time that has occurred since the last time a cycling stage was turned "off" or "on" or an additional stage was added or subtracted.

The system then asks the question, is the T sensor' value above the first make level as is shown by decision box 310. If the answer is no, then the system branches to the left in FIG. 7 and asks the question, is the T sensor' value below the first break level, TB1? This is shown by decision box 312. Again, if the answer is no, the system branches to a command box 314 labelled "return" in which case the temperature being between the TB1 and TM1 levels, no action is required and the procedure starts again at command box 300.

In the event that the T sensor' level is above the first make level, the answer from decision box 310 will be yes in which event the microprocessor computes the temperature sensor's rate of change according to the formula R=d(T sensor)/dt as is shown by the procedure box 316. After this action, the microprocessor asks the question is the temperature falling fast enough? as is shown by decision box 318. The microprocessor is set so as to prevent operation of switches when the rate of rising or falling temperature is above a predetermined value. If the answer from decision box 310 is yes, showing that the temperature is already falling fast enough and that no further action need be taken to increase the amount of cooling, the system branches to the command box 320 labelled "return" and the procedure will start over again at command box 300. In the event that the temperature is not falling fast enough by itself and some additional stage of cooling is required, then decision box 318 will produce a no answer and branch to the next lower decision box 322 which asks the question, is the cycling stage "on" (ISW=1)? This step in the process determines whether or not the stage identified as the cycling stage is presently on or, in other words, whether the cycling stage switch 110, 112, 114 or 116 of FIG. 2 is closed. This step is necessary since if the cycling stage is not "on", then it should be turned "on" but if the cycling stage is already "on", then the system should consider whether or not to turn "on" an additional stage of cooling. Accordingly, if the answer is yes, the system will branch to the right in FIG. 7 to a series of decision boxes which will be described hereinafter. If the decision is no, the system branches to the next lower decision box 324 where the question is asked, has the minimum "off" time past? As described above, it is desirable to limit the rapid cycling of "on" and "off" of the various stages and accordingly, in the present invention, it is desirable to wait until after some minimum predetermined time has elapsed since the last switch action has occurred to determine whether or not a stage should be turned "on" or "off". The microprocessor is programmed with predetermined minimum "on" and "off" times and utilizes the timer to perform this function. In the present case, the cycling stage has been "off" and so box 324 wants to determine whether or not it has been off long enough to allow it to be reactivated. If the answer to the question is "no", the system branches to command box 326 labelled "return" in which case the process is started again. On the other hand, if the minimum time has elapsed, then the system branches to procedure box 328 which commands the sytem to turn "on" the cycling stage or make ISW=1. After this has occurred, the system leads to a prodecure box 330 where the timer is reset to 0 since a switching action has occurred and thereafter the system updates the number of stages operating in a procedure box 332 which determines the number of stages that are presently operating from the equation N=NSC+ISW−1 where NSC is the number of the presently cycling stage, ISW is the condition of the cycling stage whether "on" or "off" with 1 being "on" and 0 being "off". In the present case, if the first stage had been the cycling stage and it had previously been "off" but was now "on" by virtue of the affect of procedure box 328, NSC would equal 1, ISW would equal 1 and the number of stages cycling would then be 1+1−1=1. It is at this stage of the procedure that the microprocessor 60 of FIG. 2 would command that the first switch 110 be closed to assure that one stage in the chiller stage device 120 was operating in a cooling mode. The procedure box 328 does not itself turn any switch "on" but merely commands that ISW be set to 1. After the number of stages has been updated in FIG. 7 by procedure box 332, the system leads to a command box 334 labelled "return" which causes the system to return to the start 300.

Returning now to decision box 322 which asks the question, is the cycling stage "on", it will be assumed that the answer to that question is yes in which case the system branches to a decision box 340 which asks the question is T sensor' above the second make level TM2? At this point, it has already been determined that the cycling stage is "on" and accordingly, the system must determine whether or not an additional stage should be added. As explained in connection with FIGS. 3, 4 and 5 in the present invention, the next stage would not be added unless the temperature had risen above the TM2 level and accordingly, if the answer to this question is no, the procedure leads to a command box 342 labelled "return" and the system starts again. If, however, the temperature is above the TM2 level, then the system branches to a decision box 344 which asks the question, has the minimum "on" time past and again, if the minimum time has not past, it is desirable that no further action be taken to limit the amount of cycling involved. Accordingly, a no decision leads to a command box 346 which is labelled "return" and the system starts again. On the other hand, if the minimum time has elapsed, the answer to the question is yes and the system branches to a decision box 348 which asks the question, is the cycling stage the last stage? This question is necessary since the system has a finite number of stages of cooling and if the last or final stage is already the cycling stage, no further action can occur since there are no further stages to turn "on". Accordingly, if the answer to this question is yes, the system branches to a command box 350 which is labelled "return" and the system starts again. On the other hand, if the cycling stage is not the final or last stage, then the answer to the question is no and the system leads to a procedure box 352 which tells the system to increase the cycling stage number by one. Thus if the first stage was the cycling stage and it was already "on", then decision box 352 would make the second stage the cycling stage and the value NSC would become 2. The system would then again lead to the procedure box 330 so that the timer was reset to 0 by virtue of the fact that an additional switching action had occurred after which the system would lead to procedure box 332 to solve the equation NSC+ISW−1 to determine the number of stages that are on. In the present instance, with NSC equal to 2 and ISW=1, the equation would result in a value of 2 and accordingly, the microprocessor of FIG. 2 would command that both switch 110 and 112 would be turned "on" so that two stages of cooling in the chiller stages box 120 were operating in an "on" condition. Again, thereafter, the system returns to command box 334 labelled "return" and the system starts over again.

Returning now to decision box 312 in the upper part of FIG. 7, if, after the decision box 310 has determined that the T sensor' level is not above the first make level and the T sensor' is found to be below the first break level, then it is possible that the cycling stage should be turned "off" or that if already "off", the next lower stage should be turned "off". Accordingly, if the answer to the question is yes, the system leads to a procedure box 360 which operates the same as procedure box 316 and determines the rate of change of temperature. Thereafter, a decision box 362 asks the question, is the temperature rising fast enough? Here again, it will not be necessary to turn "off" any stages if the temperature is already rising at a rate considered acceptable and accordingly, if this is the case, the system leads to a command box 364 labelled "return" and the system starts over again. On the other hand, if the temperature is not rising fast enough, the answer to the question is no and the system leads to a decision box 366 which asks the question, is the cycling stage "off"? This question is necessary since if the cycling stage is presently "off", then no further action should occur unless the temperature has fallen below the TB2 level as was explained in connection with FIGS. 3, 4 and 5. Accordingly, if the answer is yes, the system branches to the left in FIG. 7 to a series of decision boxes which will be described hereinafter. On the other hand, if the cycling stage is presently "on", it may be desirable to turn it "off" and accordingly, a no answer to this question leads to a decision box 368 which asks the question, has the minimum "on" time past? Here again, in order to avoid too much cycling "on" and "off", a minimum time is set in the microprocessor before it is possible to turn an already "on" stage "off". Accordingly, if the answer to this question is no, the system leads to a command box 370 labelled "return" and the system starts over. On the other hand, if the minimum "on" time has past, then the answer to the question is yes and the system branches to a procedure box 372 which tells the system to turn "off" the cycling stage or make ISW equal to 0. Here again, this does not actually cause the cycling stage to go "off" at this point but merely informs the system that the cycling stage should be turned "off" since all the conditions have been met. After ISW has been set to 0, the system leads to the procedure box 330 where the timer is again set to 0 since a switching action has occurred and thence to the procedure box 332 where the equation NSC+ISW−1 is solved to actually turn "off" the cycling stage as commanded. In the present case, if the cycling stage were 2, and with ISW having been set to 0, the equation would be 2+0−1=1 and the microprocessor would command that only the first switch or switch 110 in FIG. 2 be closed so that the chiller stage 120 would have one stage operating in an "on" condition.

Assume now that in decision box 366 it has been determined that the cycling stage is already "off" so that the answer to the question is yes, then, the system branches to a decision box 380 which asks the question, is the T sensor' below the second break level TB2. Here again, if the cycling stage is "off", it may be desirable to turn "off" the next lower stage but this only occurs if the temperature has fallen below the TB2 level as was explained in connection with FIGS. 3, 4 and 5. Accordingly, if the answer to the question is no, the system branches to a command box 382 labelled "return" and the system starts over again. On the other hand, if the temperature is below the TB2 level, the answer to the question is yes, then the system branches to a decision box 384 where the question is again asked, has the minimum "on" time past? This question is similar to the question asked by decision box 368 in that the purpose of the box is to determine whether or not sufficient time has elapsed to allow the system to overcome any lag that might be inherent and accordingly, a minimum time is set to allow any stage is either "off" or "on" to catch up with the lag. If the minimum "on" time has not been past, then the system may not have had enough time to catch up with the inherent lag and no further stages need be turned "off" to accomplish the desired return of the temperature to the appropriate zone. Accordingly, if the answer to the question is no, the system branches to a command box 386 labelled "return" and the system starts over. On the other hand, if the minimum "on" time has past and the system has had an opportunity to catch up within the lag, then the answer to the question would be yes and the system branches to a decision box 388 where the question is asked, is the cycling stage the first stage? As with the decision box 348 on the right of FIG. 7, if the cycling stage is already the first stage and it is presently "off", there can be no further turn "offs" of any other stage and this is as far as the system can operate. Accordingly, if the answer to the question is yes, the system branches to a command box 390 labelled "return" and the system starts over. On the other hand, if the cycling stage is not the first stage, the answer to the question is no and the system branches to a procedure box 392 which tells the system to decrease the cycling stage number by 1. Accordingly, if the cycling stage had been stage number 2, box 392 would change the cycling stage or NSC to 1. Thereafter, the system would lead to the procedure box 330 where again the timer would be set to 0 since a switching event had occurred and thereafter to procedure box 332 where the equation NSC+ISW−1 would be solved. In this case, with NSC being 1 and ISW being 0, the equation would be 1+0−1=0 in which event the microprocessor 60 of FIG. 2 would command that all of the switches 110-116 be turned "off" so that no chiller stages would be presently "on". Thereafter, the system would again return to command box 334 labelled "return" and the system would start over again.

It is thus seen that the present invention, utilizing dual deadbands, allows the operation of a condition control system such as a heating or cooling system to operate without unnecessary turning "off" and "on" of the various stages thus protecting the equipment and still maintaining the temperature proximate the T setpoint as is desired. Many obvious changes or modifications to the system described in connection with the preferred embodiment will occur to those skilled in the art and accordingly, I do not wish to be limited to the disclosures used in connection therewith. I intend to be limited only to the following claims.

The embodiments of the invention in which an exclusive property or right is claimed are defined as follows:

1. In a condition control system including a plurality of condition control devices each operable from a first state to a second state to change the condition at a predetermined location, so as to maintain the condition proximate a predetermined value, the improvement comprising:
condition responsive means including a condition sensor positioned at the predetermined location and the condition responsive means operable to produce a first signal which varies with changes of condition sensed by the condition sensor;
control means connected to the condition responsive means to receive the first signal and operable to produce a control signal, the control signal having a first characteristic when the condition sensed by the condition sensor is greater than a first predetermined amount above the predetermined value, having a second characteristic when the condition sensed by the condition sensor is greater than a second predetermined amount above the predetermined value, having a third characteristic when the condition sensed by the condition sensor is less than a third predetermined amount below the predetermined value and having a fourth characteristic when the condition sensed by the condition sensor is less than a fourth predetermined amount below the predetermined value; and means for connecting the control means to the plurality of condition control devices to present the control signal thereto, a first of the condition control devices being turned from the first state to the second state upon receipt of a control signal of the first characteristic and being turned from the second state to the first state by a control signal of the third characteristic only when no other of the condition control devices is in the second state, a second of the condition control devices being turned from the first state to the second state upon receipt of a control signal of the second characteristic only when the first condition control device is in the second state, and the second of the condition control devices thereafter being turned from the first state to the second state and from the second state to the first state upon receipt of output signals of the third characteristic and first characteristic respectively so long as the first of the condition control devices remains in the second state.

2. Apparatus according to claim 1 wherein after the second condition control device is in the second state, the first condition control device is turned from the second state to the first state only after receipt of an output signal of the fourth characteristic.

3. Apparatus according to claim 1 including a third condition control device which is turned from the first state to the second state upon receipt of an output signal of the second characteristic only when the second condition control device is in the second state and thereafter being turned from the second state to the first state and from the first state to the second state upon receipt of output signals of the third and first characteristic respectively so long as the second condition control device remains in the second state.

4. Apparatus according to claim 3 wherein after the third condition control device is in the second state, the second condition control device is turned from the second state to the first state only upon receipt of an output signal of the fourth characteristic.

5. Apparatus according to claim 3 including a fourth condition device which is turned from the first state to the second state upon receipt of an output signal of the second characteristic only when the third condition control device is in the second state and thereafter being turned from the second state to the first state and from the first state to the second state upon receipt of output signals of the third and first characteristic respectively so long as the third condition control device remains in the second state.

6. Apparatus according to claim 5 wherein after the fourth condition control device is in the second state, the third condition control device is turned from the second state to the first state only upon receipt of an output signal of the fourth characteristic.

7. Apparatus according to claim 1 wherein the condition to be controlled is temperature, the control devices are temperature change producing devices, the condition responsive means is temperature responsive means and the condition sensor is a temperature sensor.

8. Apparatus according to claim 7 wherein the temperature change producing devices are chillers, the first state is "off" and the second state is "on".

9. Apparatus according to claim 7 wherein the first signal varies with changes of temperature by adding to the temperature sensed by the temperature sensor a value which is a function of the integrated difference between the temperature sensed by the temperature sensor and the predetermined value.

10. Apparatus according to claim 1 including means for measuring the time a condition control device is in the first state and the second state for preventing a condition control device from changing states unless a minimum predetermined time has elapsed since the last time a condition control device has changed states.

11. Apparatus according to claim 1 including means for measuring the rate of change of the condition for preventing a condition control device from changing states if the rate is above a predetermined value.

12. Apparatus for use with first and second condition control devices each operable upon receipt of a signal to change from a first state to a second state so as to change the value of the condition and a sensing device having an output indicative of the value of the condition comprising:

means for connection to the sensing device to receive the output and operable to produce a condition signal of magnitude which varies with variations in the condition;

means establishing first and second reference values indicative of the range in which the condition signal will be allowed to vary in order that the condition be maintained proximate a desired value;

means establishing third and fourth reference values above and below the first and second reference values respectively;

comparing means comparing the condition signal with the first, second, third and fourth reference values to produce a first output signal when the condition signal is greater than the first reference value, a second output signal when the condition signal is less than the second reference value, a third output signal when the condition signal is greater than the third reference value and a fourth output signal when the condition signal is less than the fourth reference value; and means for connecting the comparing means to the first and second condition control devices so that as long as the second condition control device is in the first state, the first condition control device will be changed from the first to the second state upon receipt of the first output signal and changed from the second state to the first state upon receipt of the second output signal, and so long as the first condition control device is in the second state, the second condition control device will be changed from the first state to the second state upon receipt of the second control signal, thereafter the second condition control device will be changed from the second state to the first state upon receipt of the second output signal and changed from the first state to the second state upon receipt of the first output signal.

13. Apparatus according to claim 12 wherein after the second condition control device has been changed to the second state, the first condition control device will be changed to the first state only upon receipt of a fourth output signal and thereafter will again be changed to the second state upon receipt of the first output signal and to the first state upon receipt of the second output signal.

14. Apparatus according to claim 13 including means for determining the length of time since the last change of state of a condition control device and operable to prevent further changes of state of a condition control device until the time exceeds a predetermined minimum.

15. Apparatus according to claim 13 including means for determining the rate of change of the condition and operable to prevent further changes of state of a condition control device whenever the rate is greater than a predetermined minimum.

16. Apparatus according to claim 13 further including a third condition control device changeable from a first state to a second state upon receipt of a signal and means for connecting the comparing means to the third condition control device so that as long as the second condition control device is in the second state, the third condition control device will be changed from the first state to the second state upon receipt of a third output signal, thereafter the third condition control device will be changed from the second state to the first state upon receipt of the second output signal and changed from the first state to the second state upon receipt of the first output signal.

17. Apparatus according to claim 16 wherein after the third condition control device is in the second state, the second condition control device is changed to the first state only upon receipt of the fourth output signal and thereafter will again be changed to the second state upon receipt of the first output signal and to the first state upon receipt of the second output signal.

18. Apparatus according to claim 17 further including a fourth condition control device changeable from a first state to a second state upon receipt of a signal and means for connecting the comparing means to the fourth condition control device so that as long as the third condition control device is in the second state, the fourth condition control device will be changed from the first state to the second state upon receipt of a third output signal, thereafter the fourth condition control device will be changed from the second state to the first state upon receipt of the second output signal and changed from the first state to the second state upon receipt of the first output signal.

19. Apparatus according to claim 18 wherein after the fourth condition control device is in the second state, the third condition control device is changed to the first state only upon receipt of the fourth output signal and thereafter will again be changed to the second state upon receipt of the first output signal and to the first state upon receipt of the second output signal.

20. Apparatus according to claim 19 wherein the condition being controlled is temperature, the control devices are temperature change producing devices and the sensing device is a temperature sensor.

21. Apparatus according to claim 20 wherein the temperature change producing devices are chillers, the first state is "off" and the second state is "on".

* * * * *